(12) United States Patent
Greborio et al.

(10) Patent No.: US 8,040,918 B2
(45) Date of Patent: Oct. 18, 2011

(54) DYNAMIC BANDWIDTH ALLOCATION IN A PASSIVE OPTICAL ACCESS NETWORK

(75) Inventors: Laura Greborio, Turin (IT); Silvia Colli Cantone, Turin (IT)

(73) Assignee: Telecom Italia S.p.A., Milan (IT)

( * ) Notice: Subject to any disclaimer, the term of this patent is extended or adjusted under 35 U.S.C. 154(b) by 93 days.

(21) Appl. No.: 12/448,305

(22) PCT Filed: Dec. 18, 2006

(86) PCT No.: PCT/EP2006/069860
§ 371 (c)(1),
(2), (4) Date: Oct. 14, 2009

(87) PCT Pub. No.: WO2008/074364
PCT Pub. Date: Jun. 26, 2008

(65) Prior Publication Data
US 2010/0027561 A1    Feb. 4, 2010

(51) Int. Cl.
*H04J 3/22* (2006.01)
(52) U.S. Cl. ........................................ 370/468
(58) Field of Classification Search .................. 370/468
See application file for complete search history.

(56) References Cited

OTHER PUBLICATIONS

"A Broadband Optical Access System with Increased Service Capability Using Dynamic Bandwidth Assignment," Series G: Transmission Systems and Media, Digital Systems and Networks, Digital Sections and Digital Line System—Optical Line Systems for Local and Access Networks, ITU-T G.983.4, pp. i-v, and 1-82, (Nov. 2001).

"Gigabit-Capable Passive Optical Networks (G-PON): Transmission Convergence Layer Specification," Series G: Transmission Systems and Media, Digital Systems and Networks, Digital Sections and Digital Line System—Optical Line Systems for Local and Access Networks, ITU-T G.984.3, pp. i-v, and 1-135, (Mar. 2008).

Angelopoulos, J.D. et al., "A GPONG MAC Controller Adapting to Varying Number of Active Users, Traffic Volume and Qos" International Conference on Computer, Communications and Control Technologies 2003, Orlando, Florida, Jul. 31, Aug. 1-2, 2003, 6 sheets, (2003).

Leligou, N. et al., "D3.1 Top Level Specification of the TC Layer" IST-2001-34523-GIANT, GigaPON Access Network, XP002442650, pp. 1-45, (Nov. 29, 2002).

Tsang, I-J. et al., "D4.1 Top Level Specification of the PTSP, TC and MAC Components," IST-2001-34523-GIANT, GigaPON Access Network, XP002288126, pp. 1-38, (Mar. 12, 2003).

Angelopoulos, J. D. et al., "Efficient Transport of Packets with QoS in an FSAN-Aligned GPON," IEEE Communications Magazine, IEEE Service Center, New York, vol. 42, No. 2, pp. 92-98, XP001047862, (Feb. 2004).

*Primary Examiner* — Derrick W Ferris
*Assistant Examiner* — Gbemileke Onamuti
(74) *Attorney, Agent, or Firm* — Finnegan, Henderson, Farabow, Garrett & Dunner, L.L.P.

(57) ABSTRACT

A method of allocating upstream bandwidth in a passive optical access network includes associating a first timer to a first upstream traffic flow and associating a second timer to a second upstream traffic flow. During a given frame period, if the first timer is at its expiration value and the second timer is not at its expiration value, then a first portion of the upstream bandwidth is allocated to the first upstream traffic flow. If a second portion of the upstream bandwidth is left, at least part of that second portion is allocated to the second upstream traffic flow before the second timer expires. If the first and second timers have not expired, then at least part of the upstream bandwidth is allocated to at least one of the first and second upstream traffic flows.

25 Claims, 10 Drawing Sheets

| | SPM | | | | | | | |
|---|---|---|---|---|---|---|---|---|
| Alloc-ID1 | NTid1 | TCt1 | SRf1 | DBRuf1 | FECf1 | NBmin1 | NBmax1 | TT1 |
| Alloc-ID2 | NTid2 | TCt2 | SRf2 | DBRuf2 | FECf2 | NBmin2 | NBmax2 | TT2 |
| ⋮ | | | | | | | | |
| Alloc-IDN | NTidN | TCtN | SRfN | DBRufN | FECfN | NBminN | NBmaxN | TTN |

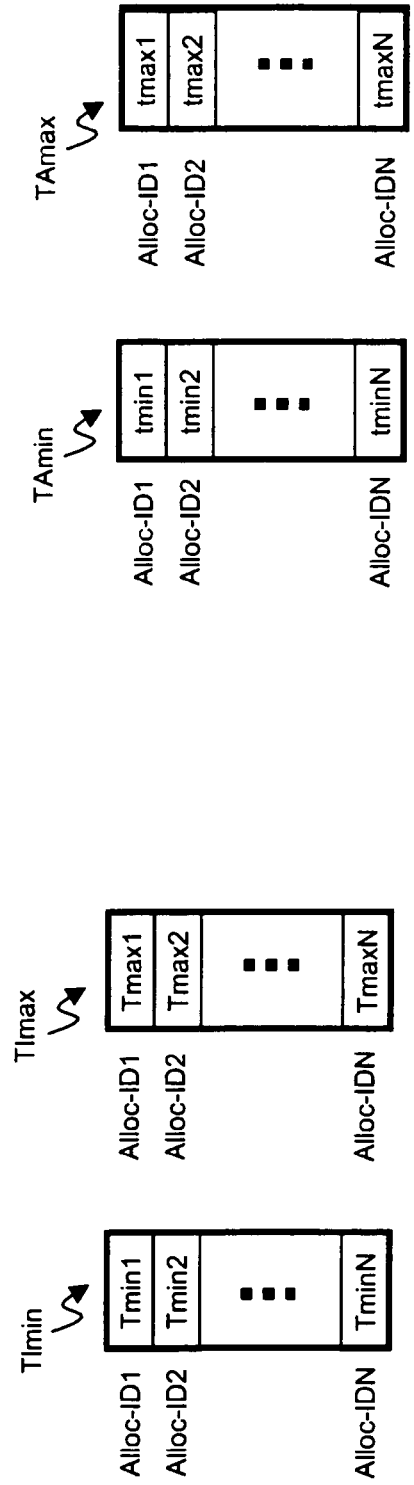

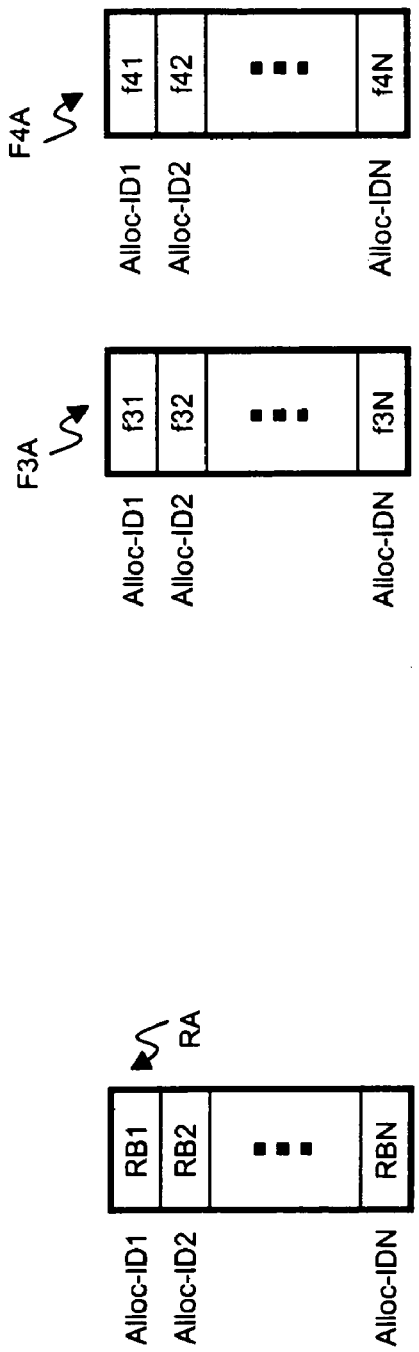

DYNAMIC BANDWIDTH ALLOCATION IN A PASSIVE OPTICAL ACCESS NETWORK

CROSS REFERENCE TO RELATED APPLICATION

This application is a national phase application based on PCT/EP2006/069860, filed Dec. 18, 2006.

TECHNICAL FIELD

The present invention generally relates to the field of access networks. More particularly, the present invention relates to a method of dynamically allocating upstream bandwidth in a passive optical access network, more particularly (but not exclusively), in a Gigabit-capable passive optical network (or, briefly, GPON).

BACKGROUND ART

An access network is a telecommunication network allowing to connect one or more end users to a core network, which can be either a circuit-switched network or a packet-switched network.

More particularly, an optical access network is an access network implemented through optical fibers and either active optical devices (amplifiers, regenerators, switches, etc.) or passive optical devices (couplers, splitters, etc.).

A particularly advantageous type of optical access network is the so-called "passive optical network", or briefly PON. A PON comprises an optical distribution network which is mainly built up of passive optical components forming a tree structure.

The root of such an optical distribution network is connected to an optical line termination, which interfaces the PON with the core network. Further, each leaf of the tree structure is connected to a network termination, which is typically located at the customer premises (e.g. cabinet, building, home), and which interfaces the PON with one or more end users.

Different types of PONs are known in the art, such as ATM PONs, Broadband PONs, Ethernet PONs and Gigabit-capable PONs (or, briefly, GPONs). Each type of PON is adapted to carry different kinds of traffic at different speeds. For instance, a GPON allows to transport different kinds of traffic such as ATM traffic, Ethernet traffic, TDM traffic, etc., at speeds up to 2.5 Gb/s.

In a PON, traffic may be transmitted either in downstream direction (i.e. from the optical line termination to the network terminations) or in upstream direction (i.e. from a network termination to the optical line termination).

Downstream traffic is typically transmitted as a flow of downstream frames generated by the optical line termination. Each downstream frame typically has a header and a payload, which payload comprises bytes of the downstream traffic. Each downstream frame is received by all the network terminations of the PON. Each network termination processes the downstream frame header, thus determining whether the downstream frame comprises bytes of downstream traffic addressed to it. In the negative, the network termination discards the downstream frame. In the affirmative, the network termination forwards the bytes to the end user(s) connected to it.

Upstream traffic generated by each network termination is transmitted according to the known time division multiple access technique.

More particularly, a network termination typically is in charge of transmitting on a PON different upstream traffic flows. Such different upstream traffic flows may be for instance generated by different end users, or by a single end user enjoying different services (e.g. telephone service, video-on-demand service, Internet, etc.) supported by the PON. Typically, each upstream traffic flow traveling in a PON has an identifier. For instance, in a GPON each upstream traffic flow is associated to a Transmission Container (T-CONT), identified by a so-called Alloc-ID, which comprises a sequence of 12 bits.

Typically, the optical line termination of a PON allocates to each upstream traffic flow a respective upstream transmission time, during which bytes of the upstream traffic flow can be transmitted in the PON. For avoiding collisions, upstream transmission times of different upstream traffic flows do not overlap. For instance, in a GPON, the optical line termination allocates to each Alloc-ID a respective upstream transmission time. Further, in a GPON the optical line termination inserts in the header of each downstream frame a field which is termed Upstream Bandwidth Map. The Upstream Bandwidth Map comprises, for each Alloc-ID, a respective sub-field which is termed "grant". Each grant typically comprises the Alloc-ID, an upstream transmission start time and an upstream transmission stop time. Upon reception of a downstream frame, each network termination processes the Upstream Bandwidth Map comprised in the downstream frame header, and it reads grants relative to Alloc-IDs identifying upstream traffic flows which the network termination is in charge of transmitting.

In the following description and in the claims, the expression "allocating upstream bandwidth" will designate an operation of allocating a respective upstream transmission time to each upstream traffic flow traveling in a PON.

Allocation of upstream bandwidth may be either static or dynamic. In case of static allocation, each upstream traffic flow always has allocated a same upstream transmission time, independently of traffic conditions in the PON. On the contrary, in case of dynamic allocation, upstream transmission times allocated to each upstream traffic flow may vary as a function of traffic conditions in the PON. The Recommendation ITU-T G.983.4, November 2001, paragraph 1.2.3, proposes to provide the optical line termination of a BPON with a logic adapted to perform dynamic allocation of the upstream bandwidth to different Alloc-IDs.

To this purpose, the ITU-T G.983.4, November 2001, paragraph 1.4 divides the total upstream bandwidth in four different parts, which are termed: fixed bandwidth, assured bandwidth, non-assured bandwidth and best effort bandwidth. Each part of upstream bandwidth is associated to upstream traffic flows according to a different criterion.

More particularly, the fixed bandwidth is entirely reserved and cyclically allocated in order to achieve a low cell transfer delay. Therefore, if a traffic flow is provisioned with fixed bandwidth and has no cells to send, idle cells will be sent upstream from the network termination to the optical line termination. Assured bandwidth is bandwidth that is always available to the network termination if the traffic buffer is expected to have cells to transmit. If the traffic flow does not have cells to transmit, the assured bandwidth may be allocated to other traffic flows. Non-assured bandwidth is a high priority variation of additional bandwidth that is assigned to traffic flows with assured bandwidth. Finally, best effort bandwidth is bandwidth that a traffic flow may be able to use if no higher-priority traffic consumes the bandwidth; there is no assurance or guarantee that the bandwidth will be available.

Each upstream traffic flow may have upstream bandwidth allocated according to at least one of the above cited criteria. More particularly, the ITU-T G.983.4, November 2001, paragraph 8.3.5.10.2 defines four different types of "transmission container" to which an upstream traffic flow may belong. Upstream traffic flows belonging to a first type of transmission container (T-CONT1) may have only fixed bandwidth allocated. Upstream traffic flows belonging to a second type of transmission container (T-CONT2) may have only assured bandwidth allocated. Upstream traffic flows belonging to a third type of transmission container (T-CONT3) may have both assured bandwidth and non-assured bandwidth allocated. Finally, upstream traffic flows belonging to a fourth type of transmission container (T-CONT4) may have only best effort bandwidth allocated.

Further, the ITU-T G.983.4, November 2001, paragraph 1.2.4 discloses that, for dynamically allocating upstream bandwidth to Alloc-IDs, each network termination of a BPON may send to the optical line termination the status of its buffers. The OLT reassigns the bandwidth according to these reports.

In GPONs, each network termination may send a DBRu (Dynamic Bandwidth Report upstream) relative to an Alloc-ID, indicating the number of bytes of that Alloc-ID which are waiting to be transmitted in a queue at the network termination.

The ITU-T G.984.3 (paragraphs 3.20, 5.3, 7.7, 8.2.5, 8.4.2) proposes that dynamic allocation of upstream bandwidth in GPONs could be advantageously performed by taking into account both transmission containers and Dynamic Bandwidth Report upstream of the various Alloc-IDs. However, the ITU-T G.984.3 (paragraphs 3.20, 5.3, 7.7, 8.2.5, 8.4.2) does not propose any algorithm for implementing dynamic allocation of upstream bandwidth based on transmission containers and Dynamic Bandwidth Report upstream.

The paper "A GPON MAC controller adapting to varying number of active users, traffic volume and QoS" of J. D. Angelopoulos et al., International Conference on Computer, Communications and Control Technologies 2003, Orlando Fla., Jul. 31, Aug. 1-2, 2003, describes a method for dynamically allocating upstream bandwidth to Alloc-IDs in a GPON network. In particular, the allocation is decided as a function of the QoS parameters (negotiated at flow activation phase) and the temporal properties of this flow. The QoS parameters are passed to a MAC controller of the optical line termination, which keeps them in a bandwidth allocation parameter matrix. On the other hand, the temporal traffic properties are reflected in buffer length variations that are announced to the MAC controller through special report messages. Hence, the MAC controller maintains a matrix reflecting the buffer fill levels. The dynamically changing bandwidth distribution is calculated by the MAC FPGA. In particular, a guaranteed part of the bandwidth is assigned to flows of T-CONT1, T-CONT2 and T-CONT3, implying that they are allocated a fixed number of bytes with a minimum frequency. One timer per traffic flow is implemented and decreased by one every frame. Each time that a timer expires, the corresponding flow has to be assigned the contracted number of bytes, kept in the bandwidth allocation parameter matrix. Then, the surplus bandwidth allocation mechanism is triggered, leading to assignment of bandwidth to flows of T-CONT3 and T-CONT4. Both the guaranteed and the surplus bandwidth assignment require using timers.

SUMMARY OF THE INVENTION

The Applicant has noticed that the above cited solution for allocating upstream bandwidth in a passive optical network disadvantageously does not allow to optimize upstream bandwidth usage.

Indeed, according to the above known solution, during each frame period the upstream bandwidth is allocated only to upstream traffic flows having their timers expired. Therefore, if none of the upstream traffic flows has its timer expired during a certain frame period, the upstream bandwidth of that frame period is not allocated to any upstream traffic flows, independently of whether such upstream traffic flows have bytes waiting to be transmitted. Further, in a given frame period, upstream traffic flows with expired timers may have few bytes waiting to be transmitted, thus using only a part of the total upstream bandwidth. Therefore, disadvantageously, during such a frame period the upstream bandwidth is only partially used.

Therefore, the Applicant has tackled the problem of providing a method of dynamically allocating upstream bandwidth in a passive optical network, such as for instance a GPON, which allows to use more efficiently the upstream bandwidth, in particular by minimizing the amount of unused upstream bandwidth in each frame period.

An object of the present invention is providing a method of dynamically allocating upstream bandwidth in a passive optical network wherein the OLT serves the upstream traffic flows when their respective timers expire but, if bandwidth is still available, it begins to assign bandwidth even to the upstream traffic flows with not yet expired timers, serving the queues in decreasing order of number of bytes waiting to be allocated.

According to a first aspect, the present invention provides a method of allocating upstream bandwidth to at least a first upstream traffic flow and a second upstream traffic flow in a passive optical access network, the method comprising:

a) associating a first timer to the first upstream traffic flow, the first timer being initialized to a number of frame periods corresponding to a first delay between two consecutive upstream transmission start times of the first upstream traffic flow;

b) associating a second timer to the second upstream traffic flow, the second timer being initialized to a number of frame periods corresponding to a second delay between two consecutive upstream transmission start times of the second upstream traffic flow;

said first and second timers being decremented at every frame period during which no upstream bandwidth is allocated to the corresponding upstream traffic flow and until a corresponding expiration value has been reached; the method comprising, during a given frame period:

if the first timer is at its expiration value and the second timer is not at its expiration value:

c) allocating a first portion of the upstream bandwidth to the first upstream traffic flow;

d) verifying if a second portion of the upstream bandwidth is left after performing step c); and e) in the affirmative, allocating at least part of the second portion of the upstream bandwidth to the second upstream traffic flow before the second timer is at its expiration value;

if the first timer and the second timer are not at their expiration value:

f) allocating at least part of the upstream bandwidth to at least one of the first and second upstream traffic flows before respective timers are at their expiration values.

Preferably, the method comprises, upon activation of the first upstream traffic flow, associating to the first upstream traffic flow a first number of bytes waiting to be transmitted and, upon activation of the second upstream traffic flow, associating the second upstream traffic flow to a second number of bytes waiting to be transmitted. In this case, the method further comprises, during the given frame period, updating the first number of bytes and the second number of bytes according to information relating to a status of the first upstream traffic flow and the second upstream traffic flow.

Profitably, the method comprises, during the given frame period and before steps c) and f), allocating a third portion of the upstream bandwidth to a management message to be transmitted upstream by a network termination of the passive optical access network.

Preferably, the method further comprises, during the given frame period and before steps c) and f), allocating a fourth portion of the upstream bandwidth to a third traffic flow having a third timer, associated thereto, which has reached its expiration value during a preceding frame period, the preceding frame period being a silent frame period.

According to one embodiment, allocating the first portion of the upstream bandwidth comprises allocating fixed bandwidth and assured bandwidth. Alternatively, allocating the first portion of the upstream bandwidth comprises allocating non assured bandwidth. Alternatively, allocating the first portion of the upstream bandwidth comprises allocating best effort bandwidth.

According to one embodiment, the second upstream traffic flow is part of a number of upstream traffic flows to be transmitted in the passive optical access network, each of the number of upstream traffic flows is associated to a respective number of bytes waiting to be transmitted, and the first timer is at its expiration value, the method further including allocating the at least part of the second portion of the upstream bandwidth to the second upstream traffic flow if the second number of bytes has a maximum value among the respective numbers of bytes. Alternatively, the first timer and the second timer are not at their expiration values, the method further including allocating the at least part of the upstream bandwidth to to the one of said first or second upstream traffic flows having the higher number of bytes waiting to be transmitted.

According to one embodiment, the second upstream traffic flow is part of a number of upstream traffic flows to be transmitted in the passive optical access network, each of the number of upstream traffic flows is associated to a respective timer, the timers associated to the number of upstream traffic flows are not at their respective expiration value and the first timer is at its expiration value, the method further including allocating the at least part of the second portion of the upstream bandwidth to the second upstream traffic flow if the value of the second timer is closest to its expiration value among the not yet expired timers. Alternatively, the first timer and the second timer are not at their expiration values, the method further including allocating the at least part of the upstream bandwidth to the one of said first or second upstream traffic flows having the timer closer to the expiration value.

Preferably, the method further comprises, during the given frame period and before steps c) and f), requesting status report of the first upstream traffic flow and the second upstream traffic flow at predetermined frame periods.

Profitably, allocating upstream bandwidth comprises: updating the number of bytes waiting to be transmitted upstream; calculating a width of a remaining part of the upstream bandwidth after allocating; initializing the associated timer to the respective delay; and preparing an element of a sorted data structure, the element including an identifier of the upstream data flow, an identifier of a network termination responsible of transmitting the data flow and a width of the at least part of the upstream bandwidth.

According to a second aspect, the present invention provides a network apparatus for interfacing a passive optical access network and a core network, the network apparatus being configured for allocating upstream bandwidth to at least a first upstream traffic flow and to a second upstream traffic flow. The network apparatus comprises:

a first module configured for:
  a) associating a first timer to the first upstream traffic flow, the first timer being initialized to a number of frame periods corresponding to a first delay between two consecutive upstream transmission start times of the first upstream traffic flow; and
  b) associating a second timer to the second upstream traffic flow, the second timer being initialized to a number of frame periods corresponding to a second delay between two consecutive Upstream transmission start times of the second upstream traffic flow;
  said first and second timers being decremented at every frame period during which no upstream bandwidth is allocated to the corresponding upstream traffic flow and until a corresponding expiration value has been reached; and a second module configured for, during a given frame period:
  if the first timer is at its expiration value and the second timer is not at its expiration value:
  c) allocating a first portion of the upstream bandwidth to the first upstream traffic flow;
  d) verifying if a second portion of the upstream bandwidth is left after performing the step c); and
  e) in the affirmative, allocating at least part of the second portion of the upstream bandwidth to the second upstream traffic flow before the second timer is at its expiration value;
  if the first timer and the second timer are not at their expiration values
  f) allocating (8) at least part of the upstream bandwidth to at least one of the first and second upstream traffic flows before respective timers are at their expiration values.

Preferably, the first module is further configured for, upon activation of the first upstream traffic flow, associating to the first upstream traffic flow a first number of bytes waiting to be transmitted and, upon activation of the second upstream traffic flow, associating the second upstream traffic flow to a second number of bytes waiting to be transmitted. In this case, preferably, the second module is further configured for, during the given frame period, updating the first number of bytes and the second number of bytes according to information relating to a status of the first upstream traffic flow and the second upstream traffic flow.

Profitably, the second module is further configured for, during the given frame period and before steps c) and f), allocating a third portion of the upstream bandwidth to a management message to be transmitted upstream by a network termination of the passive optical access network.

Preferably, the second module is further configured for, during the given frame period and before steps c) and f), allocating a fourth portion of the upstream bandwidth to a third traffic flow having a third timer, associated thereto, which has reached its expiration value during a preceding frame period, the preceding frame period being a silent frame period.

According to one embodiment, the second module is configured for allocating the first portion of the upstream bandwidth by allocating fixed bandwidth and assured bandwidth. Alternatively, the second module is configured for allocating the first portion of the upstream bandwidth by allocating non assured bandwidth. Alternatively, the second module is configured for allocating the first portion of the upstream bandwidth by allocating best effort bandwidth.

According to one embodiment, the second upstream traffic flow is part of a number of upstream traffic flows to be transmitted in the passive optical access network, each of the number of upstream traffic flows is associated to a respective number of bytes waiting to be transmitted, and the first timer is at its expiration value, the second module being configured for allocating the at least part of the second portion of the upstream bandwidth to the second upstream traffic flow if the second number of bytes has a maximum value among the respective numbers of bytes. Alternatively, the first timer and the second timer are not at their expiration values, the second module being configured for allocating the at least part of the upstream bandwidth to the one of said first or second upstream traffic flows having the higher number of bytes waiting to be transmitted.

According to one embodiment, the second upstream traffic flow is part of a number of upstream traffic flows to be transmitted in the passive optical access network, each of the number of upstream traffic flows is associated to a respective timer, the timers associated to the number of upstream traffic flows are not at their respective expiration value and the first timer is at its expiration value, the second module being configured for allocating the at least part of the second portion of the upstream bandwidth to the second upstream traffic flow if the value of the second timer is closest to its expiration value among the not yet expired timers. Alternatively, the first timer and the second timer are not at their expiration values, the second module being configured for allocating the at least part of the upstream bandwidth to the one of said first or second upstream traffic flows having the timer closer to the expiration value.

Preferably, the second module is further configured for, during the given frame period and before steps c) and f), requesting status report of the first upstream traffic flow and the second upstream traffic flow at predetermined frame periods.

Profitably, the second module is further configured for updating the number of bytes waiting to be transmitted upstream; calculating a width of a remaining part of the upstream bandwidth after allocating; initializing the associated timer to the respective delay; and preparing an element of a sorted data structure, the element including an identifier of the upstream data flow, an identifier of a network termination responsible of transmitting the data flow and a width of the at least part of the upstream bandwidth.

According to a third aspect, the present invention provides a passive optical network comprising a network apparatus for interfacing the passive optical network with a core network, the network apparatus being as set forth above.

BRIEF DESCRIPTION OF THE DRAWINGS

The present invention will become more clear by reading the following detailed description, given by way of example and not of limitation, to be read with reference to the accompanying drawings, wherein:

FIGS. 4a, 4b, 4c, 4d, 4e, 4f and 4g show data structures used by the optical line termination for performing the method according to embodiments of the present invention;

DETAILED DESCRIPTION OF PREFERRED EMBODIMENTS OF THE INVENTION

Figure 1:
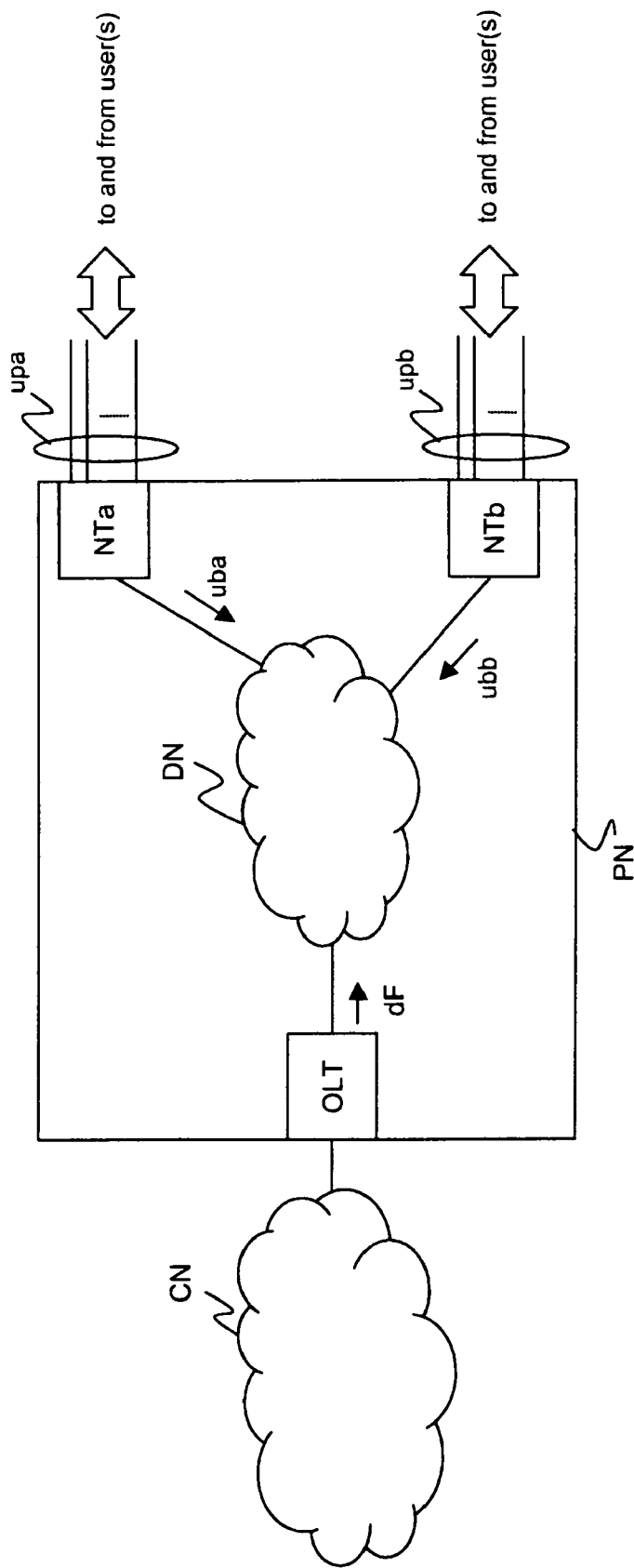
FIG. 1 schematically shows an exemplary passive optical network having two network terminations.

FIG. 1 schematically shows an exemplary passive optical network PN for connecting a plurality of end users (not shown in FIG. 1) to a core network CN. As already mentioned, the core network CN may be either a packet-switched network or a circuit-switched network.

The network PN comprises an optical distribution network DN, whose tree structure is not shown in FIG. 1 for simplicity. The network DN has a root connected to an optical line termination OLT and a plurality of leaves connected to respective network terminations. By way of example, the network PN of FIG. 1 only comprises two network terminations NTa, NTb. Each network termination NTa, NTb is provided with a respective plurality of user ports upa, upb, which connect the network terminations NTa, NTb to respective pluralities of end users (not shown in FIG. 1).

As already mentioned, the optical line termination OLT is adapted to transmit a flow of downstream frames dF to the network terminations NTa, NTb. Similarly, each network termination NTa, NTb is adapted to transmit to the optical line termination OLT respective upstream bursts uba, ubb, which are multiplexed according to the time division multiple access technique.

Figure 2:
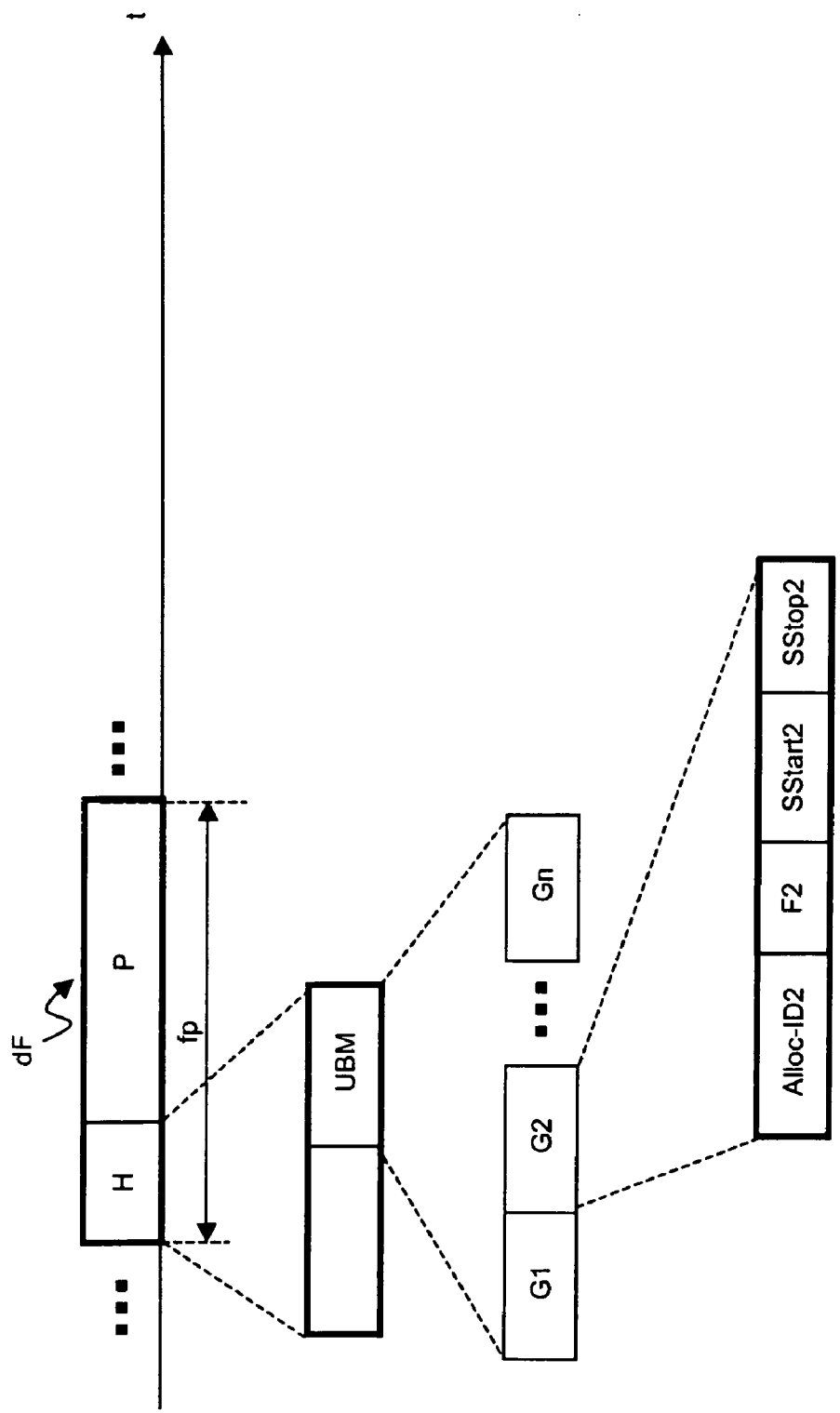
FIG. 2 schematically shows a downstream frame transmitted by the optical line termination of the network of FIG. 1.

FIG. 2 schematically shows the structure of a downstream frame dF.

Typically, as shown in FIG. 2, the downstream frame dF has a duration equal to a frame period fp. For instance, in GPONs, the frame period fp is equal to 125 μs. The downstream frame dF comprises a header H and a payload P. The payload P comprises bytes of downstream traffic directed to NTa and/or to NTb. A detailed structure of the payload P is not shown, since it is not relevant to the present description.

Typically, the header H comprises fields, among which the above cited Upstream Bandwidth Map UBM. FIG. 2 does not show any other field of the header H, since they are not relevant to the present description. As already mentioned, the field UBM comprises a plurality of grants. Typically, the number of grants is equal to the number of upstream traffic flows to which the termination OLT allocates upstream bandwidth in the current frame period. Therefore, by assuming that in the frame period fp the termination OLT allocates upstream bandwidth to n different upstream traffic flows, the field UBM comprises n grants G1, G2, ..., Gn. For instance, in case of GPONs, each grant comprises eight bytes.

By way of example, FIG. 2 only shows the detailed structure of a single grant G2, which is relative to the second upstream traffic flow to which upstream bandwidth is allocated during the current frame period fp. Only four fields Alloc-ID2, F2, SStart2, SStop2 of the grant G2 are shown in FIG. 2, since other fields are not relevant to the present description. The field Alloc-ID2 comprises the identifier of the second upstream traffic flow. The field F2 comprises, inter alia, a flag indicating whether the termination OLT is requesting to the network termination responsible of transmitting the second upstream traffic flow a Dynamic Bandwidth Report upstream relative to the second upstream traffic flow. The field SStart2 comprises the upstream transmission start time of the second upstream traffic flow, while the field SStop2 comprises the upstream transmission stop time of the second upstream traffic flow. The structures of the other grants are not shown in detail, since they are identical to the structure of the grant G2.

Figure 3:
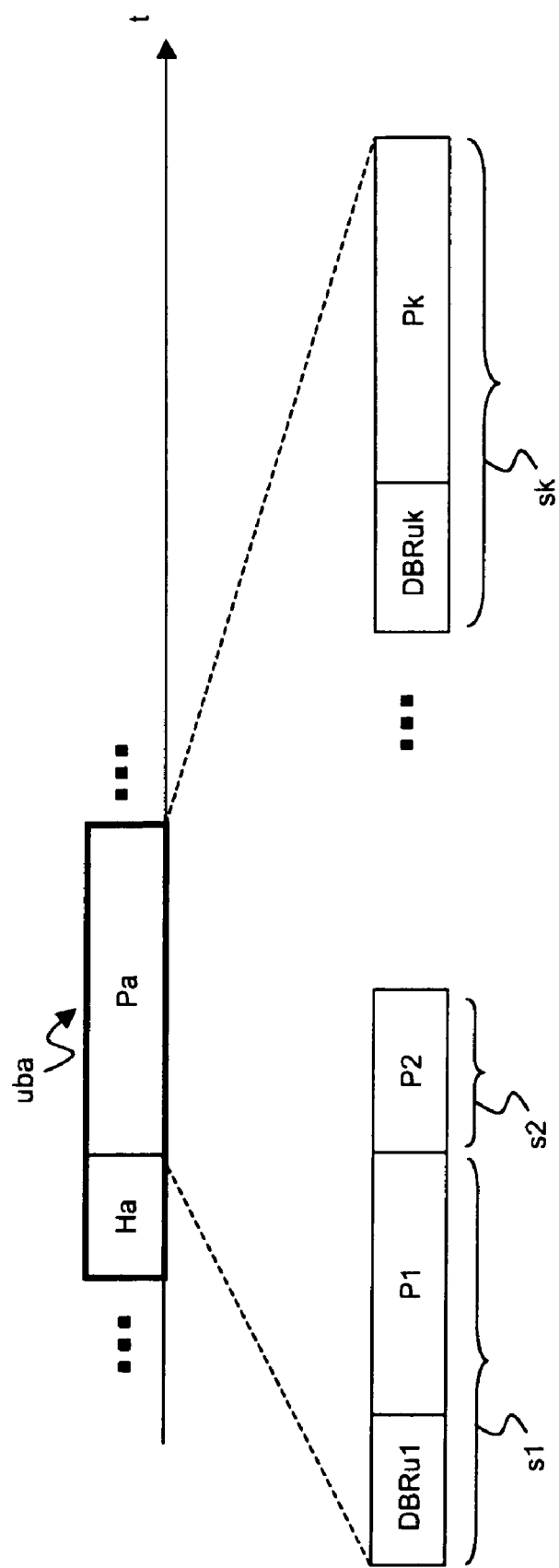
FIG. 3 schematically shows an upstream burst transmitted by a network termination of the network of FIG. 1.

FIG. 3 schematically shows the structure of an upstream burst uba transmitted by a network termination, for instance the termination NTa of FIG. 1, to the termination OLT.

The upstream burst uba typically comprises a header Ha and a payload Pa. The structure of the header Ha is not shown in FIG. 3, since it is not relevant to the present description. Herein after, it is assumed that the termination NTa transmits bytes of k different upstream traffic flows in the upstream burst uba. Under this assumption, the payload Pa typically comprises k portions s1, s2, . . . , sk. Each portion s1, s2, . . . , sk comprises a respective payload P1, P2, . . . , Pk, which comprises bytes of a respective upstream traffic flow. Each portion s1, s2, . . . , sk may also comprise the above cited Dynamic Bandwidth Report upstream, indicating the number of bytes of the respective upstream traffic flow waiting to be transmitted. A portion comprises a Dynamic Bandwidth Report upstream only if the above cited flag in the corresponding grant inserted in a downstream frame received by the network termination in a preceding frame period indicates that the termination OLT is requesting a Dynamic Bandwidth Report upstream. By way of example, FIG. 3 shows that portions s1 and sk comprise respective Dynamic Bandwidth Report upstream DBRu1, DBRuk, whilst the portion s2 does not comprise any Dynamic Bandwidth Report upstream. The size of each portion s1, s2, . . . , sk depends on the duration of each upstream transmission time allocated to each upstream traffic flow by the termination OLT.

Herein after, by referring to FIGS. 4 and 5, the method of dynamically allocating upstream bandwidth according to a first embodiment of the present invention will be described.

Upon subscription of a new Service Level Agreement, a new connection is defined and associated to a T-CONT type, according to QoS (Quality of Service) requirements. A set of service parameters is associated to the new connection and inserted in a service parameter matrix SPM, which is shown in FIG. 4a, and in two time interval vectors TImin and TImax, shown in FIG. 4b. The service parameter matrix SPM preferably comprises a row for each active traffic flow identified by an Alloc-ID. Therefore, if the PON supports N traffic flows, the service parameter matrix SPM preferably has N rows. A row of the service parameter matrix SPM relative to a given traffic flow preferably comprises:
  an identifier NTid1, NTid2, . . . , NTidN identifying the network termination which is responsible of transmitting the upstream traffic flow;
  the transmission container type TCt1, TCt2, . . . , TCtN to which the upstream traffic flow belongs;
  a flag SRf1, SRf2, . . . , SRFN indicating if the network termination is Status Reporting (SR);
  a flag DBRuf1, DBRuf2, . . . , DBRufN indicating if the network termination has to transmit the Dynamic Bandwidth Report upstream;
  a flag FECf1, FECf2, . . . , FECfN indicating if the network termination has to calculate the Forward Error Correction (FEC);
  a minimum number of bytes NBmin1, NBmin2, . . . , NBminN to be transmitted every maximum delay Tmax1, Tmax2, . . . , TmaxN;
  a maximum number of bytes NBmax1, NBmax2, . . . , NBmaxN to be transmitted every minimum delay Tmin1, Tmin2, . . . , TminN; and
  a traffic type TT1, TT2, . . . , TTN which indicates the protocol associated to the traffic flow (e.g. TDM, Ethernet, . . . ).

The time interval vectors TImin and TImax contain respectively:
  a minimum delay Tmin1, Tmin2, . . . , TminN between two consecutive upstream transmission start times of the upstream traffic flow;
  a maximum delay Tmax1, Tmax2, . . . , TmaxN between two consecutive upstream transmission start times of the upstream traffic flow;

Preferably, the minimum delays Tmin1, Tmin2, . . . , TminN and the maximum delays Tmax1, Tmax2, . . . , TmaxN are expressed in number of frame periods.

In case of allocation of fixed bandwidth and assured bandwidth, only the maximum delay and the minimum number of bytes are relevant. On the contrary, in case of allocation of non-assured bandwidth and best effort bandwidth, only the minimum delay and the maximum number of bytes are relevant. In other words, in case of upstream bandwidth allocation to upstream traffic flows belonging to T-CONT1 or T-CONT2, upstream bandwidth allocation must be performed in order to ensure that at least NBmini bytes are transmitted at most every Tmaxi. On the other hand, in case of upstream bandwidth allocation to upstream traffic flows belonging to T-CONT4, upstream bandwidth allocation must be performed in order to ensure that at most NBmaxi bytes are transmitted at least every Tmini. Further, in case of upstream bandwidth allocation to upstream traffic flows belonging to T-CONT3, upstream bandwidth allocation must be performed in order to ensure that, for the assured bandwidth, at least NBmini bytes are transmitted at most every Tmaxi and, for the non-assured bandwidth, at most NBmaxi bytes are transmitted at least every Tmini.

Further, according to embodiments of the present invention, the termination OLT may access two timer arrays TAmin and TAmax, which are shown in FIG. 4c. The timer arrays TAmin and TAmax associate to each identifier Alloc-ID1, Alloc-ID2, Alloc-IDN of each upstream traffic flow a minimum delay timer tmin1, tmin2, . . . , tminN and a maximum delay timer tmax1, tmax2, . . . , tmaxN, respectively. The minimum delay timers tmin1, tmin2, . . . , tminN are set to the minimum delay Tmin1, Tmin2, . . . , TminN at the initialization and during each frame period wherein the termination OLT allocates upstream bandwidth to the corresponding upstream traffic flow, while they are decreased by one during any different frame period during which no upstream bandwidth is allocated to such upstream traffic flow. Similarly, the maximum delay timers tmax1, tmax2, . . . , tmaxN are set to the maximum delay Tmax1, Tmax2, . . . , TmaxN at the initialization and during each frame period wherein the termination OLT allocates upstream bandwidth to the corresponding upstream traffic flow, while they are decreased by one during any different frame period during which no upstream bandwidth is allocated to such upstream traffic flow.

It should be clear that each of the minimum delay timer and the maximum delay timer may also be a decreasing timer. In other words, each of them may be set to one at initialization and during each frame period wherein the termination OLT allocates upstream bandwidth to the corresponding upstream traffic flow, while it is increased by one during any other frame period.

Therefore, the expression "timer has expired" means either that the timer has reached its minimum value, i.e. 1 (in case of a decreasing timer) or that the timer has reached its maximum value, i.e. a maximum/minimum delay (in case of an increasing timer). In the claims, the expression "expiration value" means "minimum value (in case of a decreasing timer) or maximum value (in case of an increasing timer).

Similarly, the expression "timer has expired during a given frame period" means that the timer has expired after upstream bandwidth allocation performed during the frame period immediately preceding the given frame period and before upstream bandwidth allocation performed during the given frame period. Therefore, it is not important whether the timer has actually reached its maximum/minimum value at the end of the frame period immediately preceding the given frame period or at the beginning of the given frame period.

Further, according to embodiments of the present invention, the termination OLT may access a request array RA, which is shown in FIG. 4d. The request array RA associates to each identifier Alloc-ID1, Alloc-ID2, . . . , Alloc-IDN of each upstream traffic flow a number of bytes RB1, RB2, . . . , RBN which are waiting to be transmitted. Preferably, the termination OLT may access the request array RA either for reading or updating the number of bytes RB1, RB2, . . . , RBN which are waiting to be transmitted, as it will be shown in further detail herein after.

If the request refers to an Alloc-ID associated to a T-CONT type 3 or 4, the OLT uses two flag vectors F3A and F4A (which are shown in FIG. 4e), whose elements are set to '1' if the request refers to an Alloc-ID associated to a T-CONT type 3 or 4 respectively.

Figure 5:
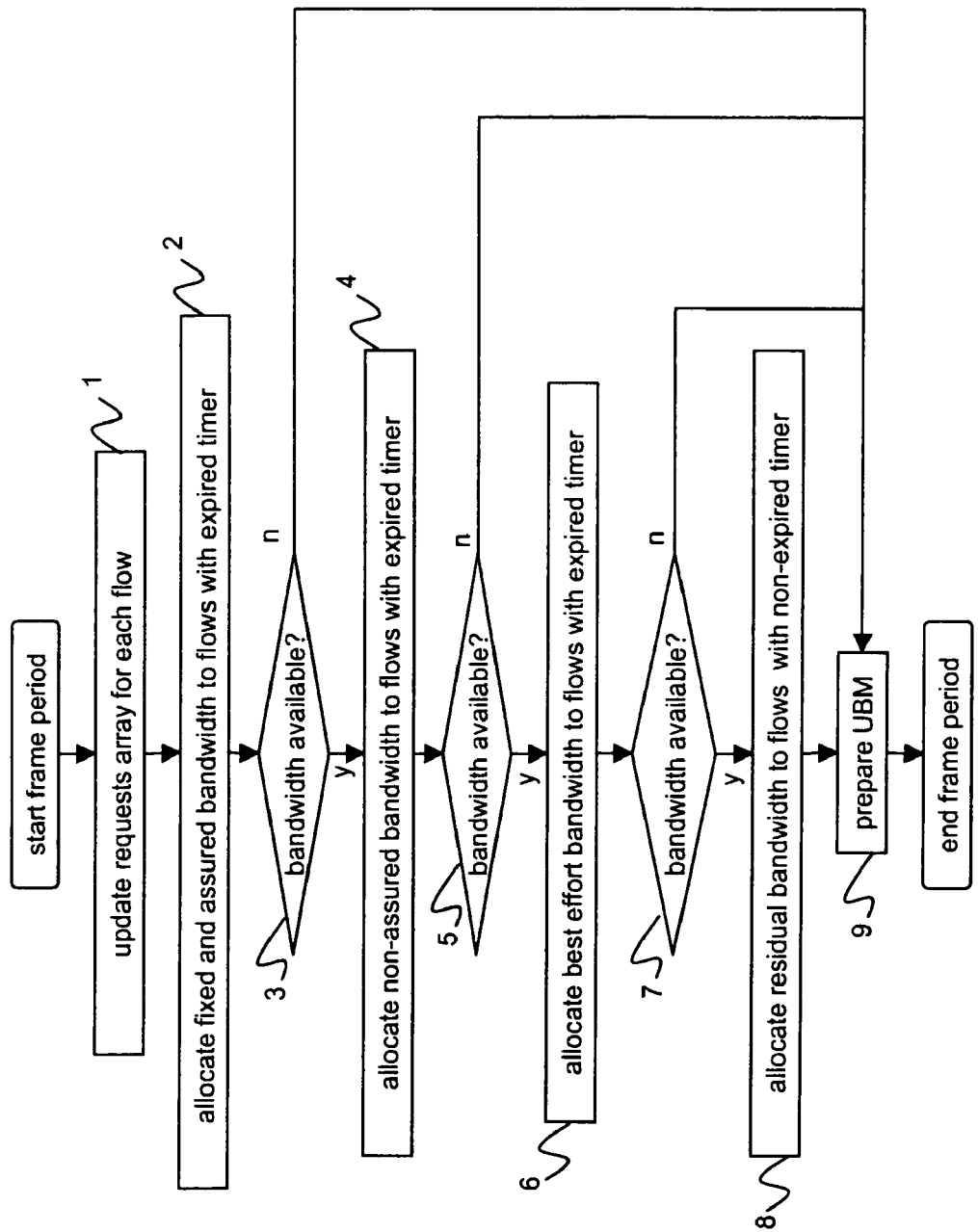
FIG. 5 is a flow chart of the method of dynamically allocating upstream bandwidth according to a first embodiment of the present invention.

According to embodiments of the present invention, the termination OLT of a PON uses the service parameter matrix SPM, the time interval vectors TImin, TImax, the timer arrays TAmin, TAmax and the request array RA for dynamically allocating upstream bandwidth, as it will be now explained by referring to FIG. 5.

FIG. 5 is a flow chart of the method for dynamically allocating upstream bandwidth, according to a first embodiment of the present invention. In particular, FIG. 5 shows the steps of the method during a single frame period. Preferably, the method is periodic, therefore the steps shown in FIG. 5 are preferably repeated at every frame period.

At the beginning of a frame period, during a first step 1 the termination OLT updates the request array RA with information comprised in possible Dynamic Bandwidth Report upstream received from the network terminations during the previous frame period. Therefore, if no Dynamic Bandwidth Report upstream has been received during the previous frame period, step 1 is not performed.

During step 2, the termination OLT allocates fixed bandwidth and assured bandwidth to upstream traffic flows with expired timer, i.e. to upstream traffic flows whose maximum delay has elapsed. More particularly, during step 2 the termination OLT reads in the timer array TAmax the values of the maximum delay timers tmax1, tmax2, . . . , tmaxK of all upstream traffic flows comprised in T-CONT1. Then, the termination OLT allocates fixed bandwidth to possible upstream traffic flows comprised in T-CONT1 having the maximum delay timer expired. Further, during step 2 the termination OLT reads in the timer array TAmax the values of the maximum delay timers tmax1, tmax2, . . . , tmaxK of all upstream traffic flows comprised in T-CONT2 and T-CONT3, and it also reads into the request array RA the number of requested bytes of all upstream traffic flows comprised in T-CONT2 and T-CONT3. Then, the termination OLT allocates assured bandwidth to possible upstream traffic flows comprised in T-CONT2 or T-CONT3 having the maximum delay timer expired and having a number of bytes waiting to be transmitted.

If no upstream traffic flow belonging to T-CONT1, T-CONT2 or T-CONT3 has its maximum delay timer expired, no upstream bandwidth is allocated during step 2.

It can be noticed that the fixed bandwidth is statically allocated, independently of the number of bytes waiting to be transmitted. Therefore, for allocating fixed bandwidth, the termination OLT does not have to access the request array RA. On the contrary, the assured bandwidth is dynamically allocated, according to the number of bytes waiting to be transmitted. Therefore, for allocating assured bandwidth, the termination OLT preferably accesses the request array RA for reading the number of bytes waiting to be transmitted, and then it allocates an assured bandwidth which preferably allows to transmit the minimum between the minimum number of bytes (NBmin) written in the service parameter matrix SPM and the number of requested bytes written in the request array RA.

During a step 3, the termination OLT checks whether the upstream bandwidth has been completely allocated or not. In the affirmative, the termination OLT performs a step 9, which will be described in detail herein after. In the negative, the termination OLT performs a step 4.

During step 4, the termination OLT allocates non-assured bandwidth to upstream traffic flows with expired timer, i.e. to upstream traffic flows whose minimum delay has elapsed. More particularly, during step 4 the termination OLT reads into the timer array TAmin the values of the minimum delay timers tmin1, tmin2, . . . , tminK of all upstream traffic flows comprised in T-CONT3 and, for T-CONT3 with expired timers and with bytes waiting to be transmitted, i.e. with the relative F3A flag set to 1, it also reads into the request array RA the number of requested bytes of all upstream traffic flows comprised in T-CONT3. Then, the termination OLT allocates non-assured bandwidth to possible upstream traffic flows comprised in T-CONT3 having minimum delay timer expired and having a number of bytes waiting to be transmitted.

Therefore, also the non-assured bandwidth is dynamically allocated, according to the number of bytes waiting to be transmitted. Therefore, for allocating non-assured bandwidth, the termination OLT preferably accesses the request array RA for reading the number of bytes waiting to be transmitted, and then it allocates a non-assured bandwidth which preferably allows to transmit the minimum between the maximum number of bytes (NBmaxi) written in the service parameter matrix SPM, the number of requested bytes written in the request array RA and the number of bytes still available in the upstream frame.

If no upstream traffic flow belonging to T-CONT3 has its minimum delay timer expired, no upstream bandwidth is allocated during step 4. During step 5, the termination OLT checks whether the upstream bandwidth has been completely allocated or not. In the affirmative, the termination OLT performs a step 9, which will be described in detail herein after. In the negative, the termination OLT performs a step 6.

During step 6, the termination OLT allocates best effort bandwidth to upstream traffic flows with expired timer, i.e. to upstream traffic flows whose minimum delay has elapsed. More particularly, during step 6 the termination OLT reads into the timer array TAmin the values of the minimum delay timers tmin1, tmin2, . . . , tminK of all upstream traffic flows comprised in T-CONT4 and for T-CONT4 with expired timers and with bytes waiting to be transmitted, i.e. with the relative F4A flag set to 1, it also reads into the request array RA the number of requested bytes of all upstream traffic flows comprised in T-CONT4. Then, the termination OLT allocates best effort bandwidth to possible upstream traffic flows comprised in T-CONT4 having minimum delay timer expired and having a number of bytes waiting to be transmitted.

Therefore, also best effort bandwidth is dynamically allocated, according to the number of bytes waiting to be transmitted. Therefore, for allocating best effort bandwidth, the termination OLT preferably accesses the request array RA for reading the number of bytes waiting to be transmitted, and then it allocates a best effort bandwidth which preferably allows to transmit the minimum between the maximum number of bytes (NBmaxi) written in the service parameter matrix SPM, the number of requested bytes written in the request array RA and the number of bytes still available in the upstream frame.

If no upstream traffic flow belonging to T-CONT4 has its minimum delay timer expired, no upstream bandwidth is allocated during step 6.

Then, according to embodiments of the present invention, during a step 7, the termination OLT checks whether the upstream bandwidth has been completely allocated or not. In the affirmative, the termination OLT performs a step 9, which will be described in detail herein after. In the negative, the termination OLT performs a step 8.

During step 8, the termination OLT allocates the residual upstream bandwidth to upstream traffic flows whose timer has not yet expired.

The termination OLT may adopt different criteria for determining the upstream traffic flows to which the residual upstream bandwidth will be allocated.

Preferably, the termination OLT may take into account only upstream traffic flows to which upstream bandwidth has not been allocated during the current frame period.

Optionally, the termination OLT can sort the upstream traffic flows according to a predetermined criterion, such as for instance the number of bytes waiting to be transmitted. To this purpose, the termination OLT reads for each upstream traffic flow the number of bytes waiting to be transmitted into the request array RA, and then it sorts the upstream traffic flows so that flows with higher number of bytes are privileged. Therefore, in this case, residual upstream bandwidth is first allocated to upstream traffic flows having a higher number of bytes waiting to be transmitted.

Alternative criteria can be applied for sorting upstream traffic flows such as the value of the maximum delay timer (for fixed bandwidth and assured bandwidth) and/or minimum delay timer (for non assured bandwidth and best effort bandwidth). For instance, the termination OLT may sort the traffic flows according to a decreasing order of their maximum or minimum delay timer value. Therefore, in this case, residual upstream bandwidth is first allocated to upstream traffic flows having a timer with a lower value (i.e. whose minimum or maximum delay is closer to expiry).

After sorting the upstream traffic flows according to one of the above criteria, the termination OLT starts allocating the residual upstream bandwidth from the first upstream traffic flow, until the upstream bandwidth is completely used.

Every time some bandwidth has been allocated to an upstream traffic flow, preferably, the termination OLT creates an element of a sorted data structure containing the values of the network termination's identifier, the Alloc-ID and the amount of granted bandwidth, and inserts it into the sorted data structure, according to the value of the identifier of the network termination which is in charge of transmitting it.

Then, the termination OLT performs a subsequent step 9, wherein it prepares the Upstream Bandwidth Map to be inserted into a downstream frame similar to the one of FIG. 2.

Preferably, upstream traffic flows transmitted by a same network termination are contiguous in the sorted data structure. Indeed, advantageously, this allows to insert bytes of different upstream traffic flows transmitted by a same network termination in a single upstream burst, thus using a single upstream header (i.e. the header Ha shown in FIG. 3). To this purpose, according to preferred embodiments of the present invention, the termination OLT creates a network termination array NTA, which is shown in FIG. 4*f*. The array NTA comprises a row for each network termination of the PON (i.e. two rows, in case of the exemplary network PN of FIG. 1). Each row refers to an identifier NTida, NTidb of a network termination and comprises a flag fa, fb. At the beginning of each frame period, preferably, the termination OLT sets the values of the flags fa, fb to a predefined value, e.g. "0". When the termination OLT allocates upstream bandwidth to a given upstream traffic flow, it determines which network termination is responsible of transmitting such an upstream traffic flow. Then, the termination OLT checks in the array NTA the value of the flag fa associated to the network termination. If the flag fa has value "0", the termination OLT changes its value in "1". Otherwise, if the flag fa already has value "1", the termination OLT leaves the value unchanged. In other words, the value of a flag associated to a given network termination is changed the first time the termination OLT allocates bandwidth to one of the upstream traffic flows that the network termination is responsible of transmitting. This allows the termination OLT to determine whether upstream bandwidth also has to be allocated for transmitting the upstream header.

Then, during step 9 the termination OLT generates an upstream transmission start time and an upstream transmission stop time for each upstream traffic flow.

For instance, it is assumed that for a given frame period the termination OLT has allocated upstream bandwidth to three upstream traffic flows identified by the identifiers Alloc-IDa1, Alloc-IDa2 and Alloc-IDa3 which are to be transmitted by the network termination NTa, and to two upstream traffic flows identified by the identifiers Alloc-IDb1 and Alloc-IDb2 which are to be transmitted by the network termination NTb. It is assumed that the termination OLT has determined to allocate to the above upstream traffic flows the following upstream bandwidths:

Alloc-IDa1: 13 bytes;
Alloc-IDa2: 40 bytes;
Alloc-IDa3: 1302 bytes;
Alloc-IDb1: 4507 bytes; and
Alloc-IDb2: 1516 bytes.

Therefore, since an upstream header of r bytes (r is equal to 15 in case of GPONs) has to be inserted at the beginning of each network termination's upstream burst, the upstream transmission start and stop times are:

| | |
|---|---|
| SStarta1=r; and | SStopa1=SStarta1+13−1; |
| SStarta2=SStopa1+1; and | SStopa2=SStarta2+40−1; |
| SStarta3=SStopa2+1; and | SStopa3=SStarta3+1302−1; |
| SStartb1=SStopa3+1+r; and | SStopb1=SStartb1+4507−1; |
| SStartb2=SStopb1+1; and | SStopb2=SStartb2+1516−1. |

Assuming that the termination OLT requires the Dynamic Bandwidth Report upstream relative to these upstream traffic flows, the upstream transmission start and stop times are:

SStarta1=r; and  
SStarta2=SStopa1+1; and  
SStarta3=SStopa2+1; and  
SStartb1=SStopa3+1+r; and  
SStartb2=SStopb1+1; and SStopa1=SStarta1+13+q−1;  
SStopa2=SStarta2+40+q−1;  
SStopa3=SStarta3+1302+q−1;  
SStopb1=SStartb1+4507+q−1;  
SStopb2=SStartb2+1516+q−1, wherein q is the size of a Dynamic Bandwidth Report upstream (i.e. 2 bytes in case of GPONs, reporting mode '0'). Further, if the traffic type TT1, TT2, . . . , TTN specified in service matrix parameter SPM indicates that the traffic transported by an upstream traffic flow requires encapsulation before transmission (for instance, in a GPON, Ethernet, TDM and OMCI—ONU Management and Control Interface—traffic require GEM—GPON Encapsulation Method—before transmission), the termination OLT also has to take into account bytes for possible headers required by encapsulation. In this case, the above calculated upstream transmission stop times have to be increased by h bytes, h being the size of such possible headers (e.g h is 5 bytes in case of GEM encapsulation).

Finally, during step 9, the identifiers of the upstream traffic flows and their upstream transmission start and stop times are inserted in respective grants, which are in turn inserted into the field UBM of the downstream frame which is going to be transmitted by the termination OLT.

Preferably, during step 9, in case the termination OLT wishes to receive a Dynamic Bandwidth Report upstream relative to an upstream traffic flow, it sets to the appropriate values the relative flags in the corresponding grant.

Therefore, advantageously, the present invention allows to optimize usage of the upstream bandwidth in each frame period. Indeed, in case upstream traffic flows with expired timer do not use the whole upstream bandwidth, thus leaving a residual upstream bandwidth, such a residual upstream bandwidth is advantageously allocated to other upstream traffic flows having bytes waiting to be transmitted, even though their timers have not expired yet. Therefore, if an upstream traffic flow has bytes waiting to be transmitted, but its timer has not expired yet, and if a residual upstream bandwidth is available, such an upstream traffic flow may be advantageously served, without leaving it to wait needlessly, and without wasting a part of the upstream bandwidth. Therefore, the present invention advantageously allows to exploit the upstream bandwidth in a more efficient way in comparison to known solutions.

Figure 6:
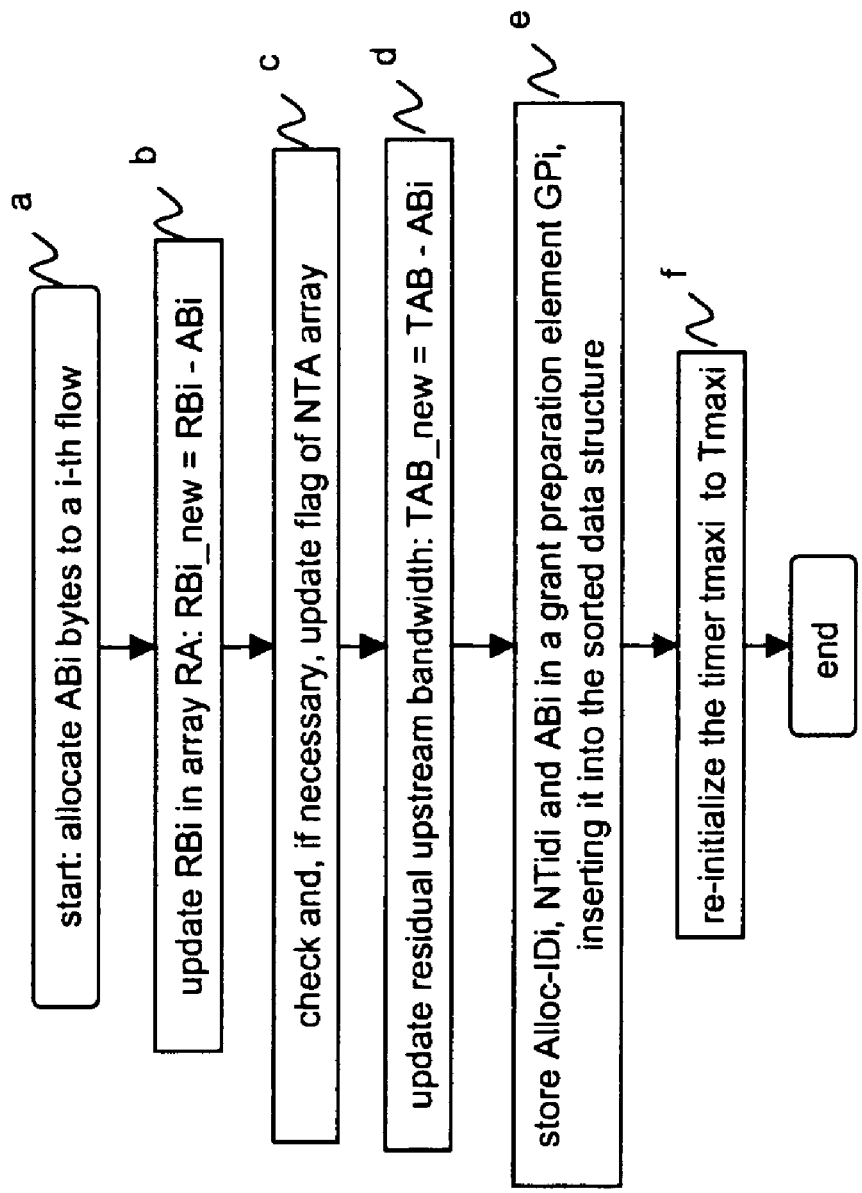
FIG. 6 is a more detailed flow chart of the step of allocating upstream bandwidth to a given upstream traffic flow, which is shown in FIG. 5.

FIG. 6 shows a more detailed flow chart of the step of allocating upstream bandwidth to a given upstream traffic flow, according to embodiments of the present invention.

It is assumed that, for instance during step 2 of FIG. 5, the termination OLT decides to allocate a number ABi of bytes to the i-th upstream traffic flow listed in the service parameter matrix SPM. Such an i-th upstream traffic flow has to be transmitted by the network termination NTa, and it is identified by an identifier Alloc-IDi. Upon allocation of the ABi bytes to the i-th upstream traffic flow (step a), the termination OLT updates in the request array RA the number RBi of bytes of the i-th upstream traffic flow waiting to be transmitted (step b). The updated number RBi_new of bytes waiting to be transmitted after allocation is: RBi_new=RBi−ABi.

During a step c, the termination OLT reads the network termination array NTA to determine whether upstream bandwidth has already been allocated to an upstream traffic flow transmitted by NTa during the current frame period. During step c, the termination OLT also updates the flag associated to NTa in the array NTA, if necessary, according to what explained above.

During a step d, the termination OLT updates the value of the residual upstream bandwidth TAB, taking into account possible Dynamic Bandwidth Report upstream, upstream header and encapsulation header, as explained above. The new residual upstream bandwidth TAB_new after allocation is: TAB_new=TAB−ABi.

During step e, the termination OLT builds a grant preparation unit GPi, i.e. a data structure comprising the identifier of the network termination, the Alloc-IDi and the allocated upstream bandwidth expressed as the number of allocated bytes ABi. The GPi element is inserted into the sorted data structure, according to the network termination identifier.

During step f, the termination OLT sets the maximum delay timer tmaxi to the maximum delay Tmaxi.

The steps a to f shown in FIG. 6 are preferably performed by the termination OLT each time the termination OLT allocates upstream bandwidth to a given upstream traffic flow, independently of the transmission container which the upstream traffic flow belongs to (i.e. steps a to f are preferably executed during steps 2, 4, 6 and 8, taking into account that in the step f the timers to be re-initialised are tmaxi for fixed and assured bandwidth and tmini for non assured and best effort bandwidth, respectively).

Figure 7:
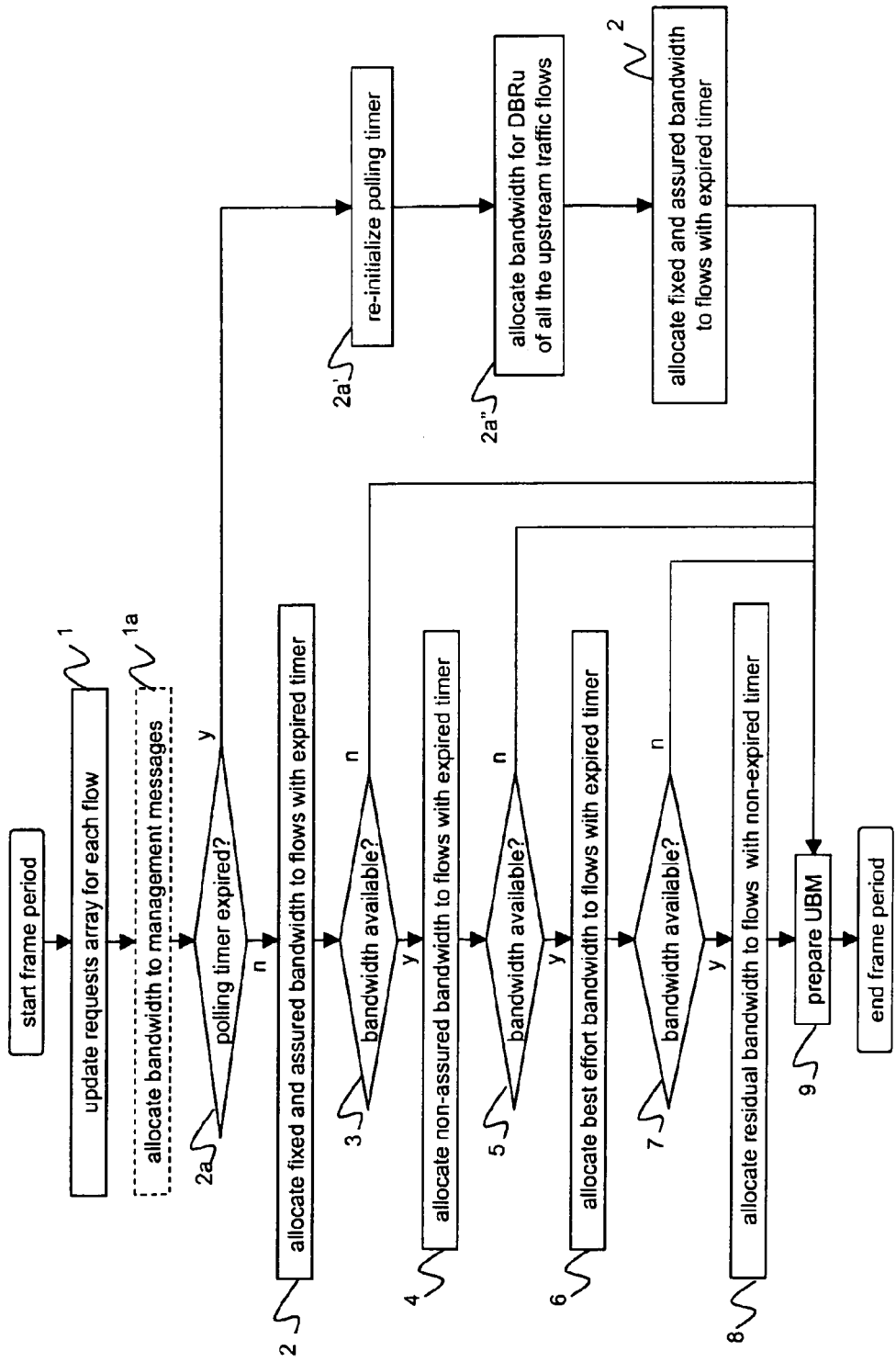
FIG. 7 is a flow chart of the method of dynamically allocating upstream bandwidth according to a second embodiment of the present invention.

FIG. 7 is a flow chart of the method of dynamically allocating upstream bandwidth according to a second embodiment of the present invention. In particular, FIG. 7 shows the steps of the method during a single frame period. Preferably, the method is periodic, therefore the steps shown in FIG. 7 are preferably repeated at every frame period.

As in the first embodiment of FIG. 5, at the beginning of the frame period, during a first step 1 the termination OLT updates the request array RA with information comprised in possible Dynamic Bandwidth Report upstream received from the network terminations during the previous frame period.

During optional step 1a, according to this second embodiment, the termination OLT allocates upstream bandwidth to possible management messages which a network termination wishes to transmit to the OLT. For instance, in a GPON, the termination OLT and the network terminations may exchange management messages which are termed PLOAM ("Physical Layer Operation Administration Management") messages. Such PLOAM messages typically comprise information for managing the GPON, such as information relative to alarms, activation of new Alloc-IDs, etc. Such PLOAM messages typically have a predefined size of 13 bytes. Therefore, if during a given frame period a network termination requests to transmit a management message to the termination OLT, according to this second embodiment the termination OLT during the successive frame period allocates upstream bandwidth for allowing the network termination to transmit the management message, before allocation of upstream bandwidth to any upstream traffic flow carrying user traffic.

According to the second embodiment shown in FIG. 7, preferably, the termination OLT periodically collects from the network terminations the Dynamic Bandwidth Report upstream of all the upstream traffic flows traveling in the PON. This mechanism is called polling. To this purpose, preferably, the termination OLT assigns a reserved Alloc-ID for the polling procedure. Preferably, such an identifier has a value lower than the values of all the other identifiers Alloc-ID1, Alloc-ID2, . . . , Alloc-IDN. For instance, in case of GPON, the polling Alloc-ID is equal to 256, which is the smallest value of Alloc-ID not used for identifying a network termination. Further, preferably, the termination OLT associates the polling Alloc-ID to a T-CONT type 1, so it has the maximum priority, and it assigns to this Alloc-ID a maximum delay and a timer. The timer is initialized to the maximum delay value at each frame period wherein the termination OLT collects the Dynamic Bandwidth Report upstream, while it is decreased by 1 during any other frame period.

Therefore, the termination OLT performs a step 2a of verifying whether the polling timer has expired. If such timer has not expired, the termination OLT executes steps 2 to 9, which has been already described by referring to FIG. 5. On the contrary, if such timer has expired, the termination OLT re-initializes the polling timer to the maximum delay Tmaxi (step 2a'), it allocates upstream bandwidth for transmission of the Dynamic Bandwidth Report upstream of all the upstream traffic flows (step 2a"), and then it performs step 2 of allocating fixed and assured bandwidth to T-CONTs with expired timer and then it performs step 9 of preparing the field UBM.

It has to be noticed that, since the polling Alloc-ID has the minimum value allowed for data transmission, this Alloc-ID is the first one analyzed by the termination OLT at each frame period, so that, if the polling timer has expired, the OLT performs firstly the polling procedure.

Figure 8:
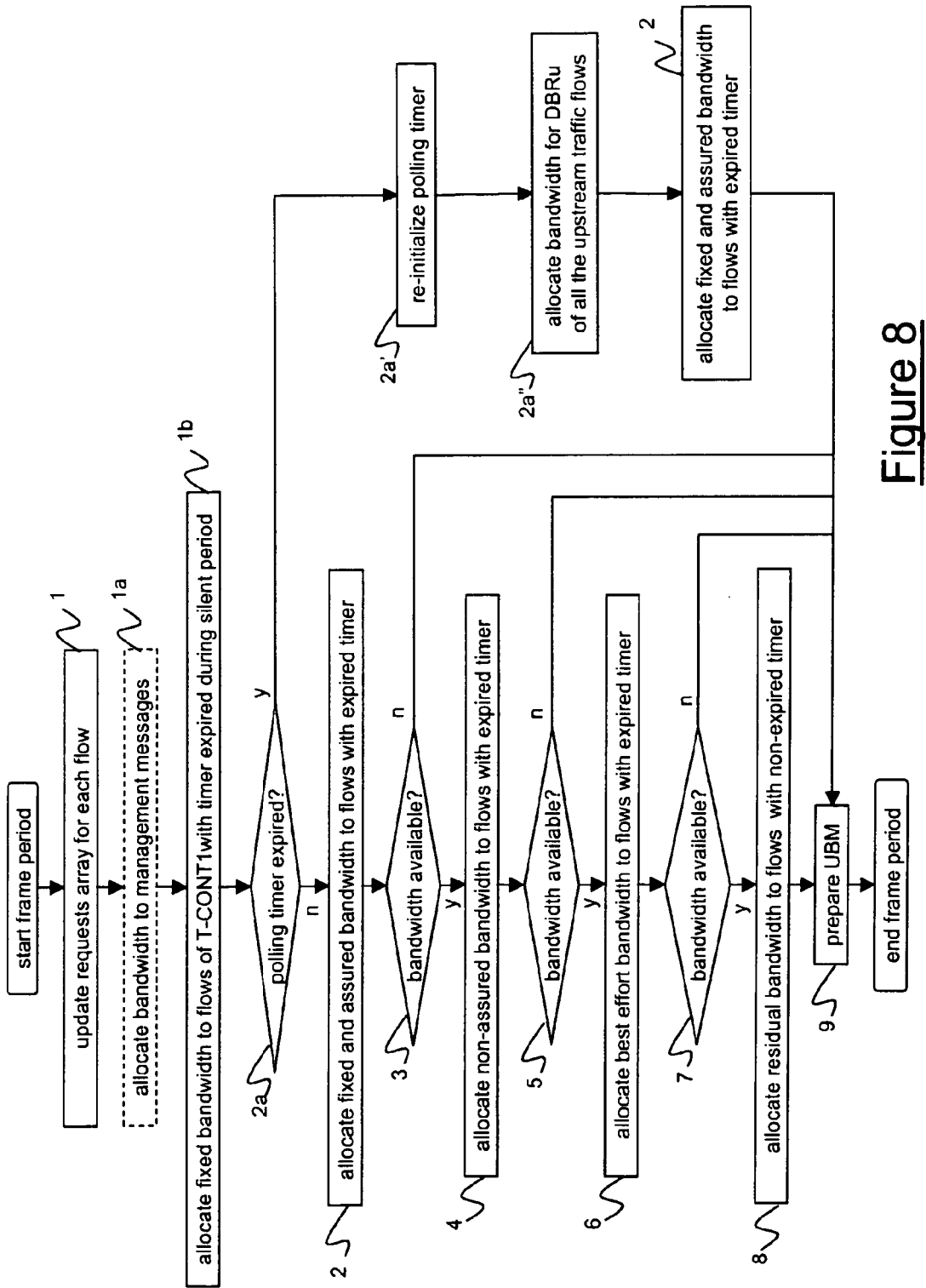
FIG. 8 is a flow chart of the method of dynamically allocating upstream bandwidth according to a third embodiment of the present invention.

FIG. 8 is a flow chart of the method of dynamically allocating upstream bandwidth according to a third embodiment of the present invention. In particular, FIG. 8 shows the steps of the method during a single frame period. Preferably, the method is periodic, therefore the steps shown in FIG. 8 are preferably repeated at every frame period.

As in the first and second embodiment shown in FIGS. 5 and 7 respectively, at the beginning of a frame period the termination OLT updates the request array RA (step 1). Then, the termination OLT allocates upstream bandwidth to possible management messages (step 1a).

Then, according to the third embodiment, the termination OLT allocates fixed bandwidth to possible upstream traffic flows of T-CONT1 whose timer has expired during a previous frame period (step 1b). This situation may happen if during one or more frame periods preceding the current frame period the network terminations were not allowed to perform upstream transmission, e.g. due to maintenance or configuration operation upon the PON. Such frame periods wherein network terminations are not allowed to performed upstream transmission are typically called "silent frame periods".

Therefore, according to this third embodiment, the termination OLT is adapted to store, during possible silent frame periods, information about upstream traffic flows of T-CONT1 whose timer expires, and to allocate upstream bandwidth to such upstream traffic flows during the first frame period wherein network terminations are allowed to perform upstream transmission, as indicated by step 1b in FIG. 8.

Then, the termination OLT performs subsequent steps 2a to 9, which have already been described by referring to FIGS. 5 and 7.

Figure 9:
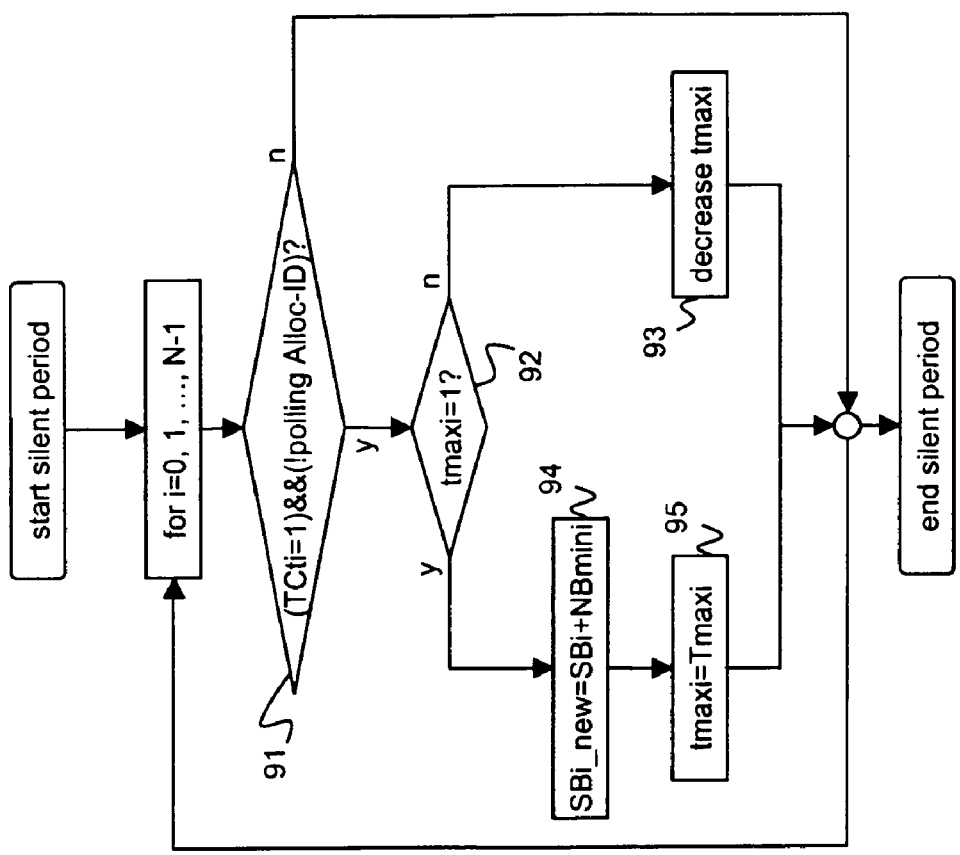
FIG. 9 is a flow chart of the method of dynamically allocating upstream bandwidth according to a third embodiment of the present invention, during a "silent" frame period.

FIG. 9 is a flow chart of the method of dynamically allocating upstream bandwidth according to the third embodiment of the present invention, during a silent frame period.

When a silent frame period starts, the termination OLT, for each upstream traffic flow listed in the service parameter matrix SPM (i.e. for each identifier Alloc-ID1, Alloc-ID2, . . . , Alloc-IDN), reads in the service parameter matrix SPM the transmission container type TCt1, TCt2, . . . , TCtN (step 91). If the i-th flow does not belong to the T-CONT1, the termination OLT does not perform any other action relative to the i-th upstream traffic flow, until the end of the silent frame period. On the contrary, if the i-th flow belongs to T-CONT1 and its Alloc-ID is not the polling Alloc-ID, the termination OLT checks the value of its maximum delay timer tmaxi (step 92). If the maximum delay timer tmaxi has not expired yet (i.e. its value is different from 1), the termination OLT decreases its value by 1 (step 93). Otherwise, if the maximum delay timer tmaxi has expired, the termination OLT updates the i-th element of the vector SB (which is shown in FIG. 4g), containing the number of bytes requested during the silent frame period for the i-th traffic flow, adding the minimum number of bytes to be allocated NBmini (step 94).

Then, the termination OLT initializes the maximum delay timer tmaxi to the maximum delay Tmaxi of the i-th upstream traffic flow (step 95). Steps 91-95 are repeated for each upstream traffic flow.

The invention claimed is:

1. A method of allocating upstream bandwidth to at least a first upstream traffic flow and a second upstream traffic flow in a passive optical access network, comprising:
    a) associating a first timer to said first upstream traffic flow, said first timer being initialized to a number of frame periods corresponding to a first delay between two consecutive upstream transmission start times of said first upstream traffic flow;
    b) associating a second timer to said second upstream traffic flow, said second timer being initialized to a number of frame periods corresponding to a second delay between two consecutive upstream transmission start times of said second upstream traffic flow,
    said first and second timers being decremented at every frame period during which no upstream bandwidth is allocated to the corresponding upstream traffic flow and until a corresponding expiration value has been reached;
    during a given frame period:
    if said first timer is at its expiration value and said second timer is not at its expiration value
    c) allocating a first portion of said upstream bandwidth to said first upstream traffic flow,
    d) verifying if a second portion of said upstream bandwidth is left after performing said step c); and
    e) in the affirmative, allocating at least part of said second portion of said upstream bandwidth to said second upstream traffic flow before said second timer is at its expiration value,
    if said first timer and said second timer are not at their expiration value
    f) allocating at least part of said upstream bandwidth to at least one of said first and second upstream traffic flows before respective timers are at their expiration values.

2. The method according to claim 1, further comprising:
    upon activation of said first upstream traffic flow, associating with said first upstream traffic flow a first number of bytes waiting to be transmitted; and
    upon activation of said second upstream traffic flow, associating said second upstream traffic flow with a second number of bytes waiting to be transmitted.

3. The method according to claim 2, further comprising, during said given frame period, updating said first number of bytes and said second number of bytes according to information relating to a status of said first upstream traffic flow and said second upstream traffic flow.

4. The method according to claim 2, wherein said second upstream traffic flow is part of a number of upstream traffic flows to be transmitted in said passive optical access network, wherein each of said number of upstream traffic flows is associated with a respective number of bytes waiting to be transmitted, and wherein said first timer is at its expiration value, and further comprising allocating said at least part of said second portion of said upstream bandwidth to said second upstream traffic flow if said second number of bytes has a maximum value among said respective numbers of bytes.

5. The method according to claim 2, wherein said first timer and said second timer are not at their expiration values, and further comprising allocating said at least part of said upstream bandwidth to the one of said first or second upstream traffic flows having the higher number of bytes waiting to be transmitted.

6. The method according to claim 2, wherein allocating upstream bandwidth comprises:
    updating said number of bytes waiting to be transmitted upstream;
    calculating a width of a remaining part of said upstream bandwidth after allocating;
    initializing an associated timer to a respective delay; and
    preparing an element of a sorted data structure, said element comprising an identifier of said upstream data flow, an identifier of a network termination responsible for transmitting said data flow and a width of said at least part of said upstream bandwidth.

7. The method according to claim 1, further comprising, during said given frame period and before steps c) and f), allocating a third portion of said upstream bandwidth to a management message to be transmitted upstream by a network termination of said passive optical access network.

8. The method according to claim 1, further comprising, during said given frame period and before steps c) and f), allocating a fourth portion of said upstream bandwidth to a third traffic flow having a third timer, associated therewith, which has reached its expiration value during a preceding frame period, said preceding frame period being a silent frame period.

9. The method according to claim 1, wherein said allocating said first portion of said upstream bandwidth comprises one of:
    allocating fixed bandwidth and assured bandwidth;
    allocating non assured bandwidth; and
    allocating best effort bandwidth.

10. The method according to claim 1, wherein said second upstream traffic flow is part of a number of upstream traffic flows to be transmitted in said passive optical access network, wherein each of said number of upstream traffic flows is associated with a respective timer, wherein the timers associated with said number of upstream traffic flows are not at their respective expiration value and wherein said first timer is at its expiration value, and further comprising allocating said at least part of said second portion of said upstream bandwidth to said second upstream traffic flow if the value of said second timer is closest to its expiration value among said not yet expired timers.

11. The method according to claim 1, wherein said first timer and said second timer are not at their expiration values, and further comprising allocating said at least part of said upstream bandwidth to the one of said first or second upstream traffic flows having the timer closer to the expiration value.

12. The method according to claim 1, further comprising, during said given frame period and before steps c) or f), requesting a status report of said first upstream traffic flow and said second upstream traffic flow at predetermined frame periods.

13. A network apparatus for interfacing a passive optical access network and a core network, said network apparatus capable of being configured for allocating upstream bandwidth to at least a first upstream traffic flow and to a second upstream traffic flow, comprising:
    a first module capable of being configured for:
        a) associating a first timer to said first upstream traffic flow, said first timer being initialized to a number of frame periods corresponding to a first delay between two consecutive upstream transmission start times of said first upstream traffic flow; and
        b) associating a second timer with said second upstream traffic flow, said second timer being initialized to a number of frame periods corresponding to a second delay between two consecutive upstream transmission start times of said second upstream traffic flow,
    said first and second timers being decremented at every frame period during which no upstream bandwidth is allocated to the corresponding upstream traffic flow and until a corresponding expiration value has been reached;
    a second module capable of being configured for, during a given frame period:
        if said first timer is at its expiration value and said second timer is not at its expiration value,
        c) allocating a first portion of said upstream bandwidth to said first upstream traffic flow,
        d) verifying if a second portion of said upstream bandwidth is left after performing step c); and
        e) in the affirmative, allocating at least part of said second portion of said upstream bandwidth to said second upstream traffic flow before said second timer is at its expiration value,
        if said first timer and said second timer are not at their expiration values,
        f) allocating at least part of said upstream bandwidth to at least one of said first and second upstream traffic flows before respective timers are at their expiration values.

14. The network apparatus according to claim 13, wherein said first module is further capable of being configured for:
    upon activation of said first upstream traffic flow, associating with said first upstream traffic flow a first number of bytes waiting to be transmitted; and
    upon activation of said second upstream traffic flow, associating said second upstream traffic flow with a second number of bytes waiting to be transmitted.

15. The network apparatus according to claim 14, wherein said second module is further capable of being configured for, during said given frame period, updating said first number of bytes and said second number of bytes according to information relating to a status of said first upstream traffic flow and said second upstream traffic flow.

16. The network apparatus according to claim 15, wherein said second module is further capable of being configured for, during said given frame period and before steps c) and f), requesting a status report from said first upstream traffic flow and said second upstream traffic flow at predetermined frame periods.

17. The network apparatus according to claim 14, wherein said second upstream traffic flow is part of a number of upstream traffic flows to be transmitted in said passive optical access network, wherein each of said number of upstream traffic flows is associated with a respective number of bytes waiting to be transmitted, and wherein said first timer is at its expiration value, wherein said second module is configured for allocating said at least part of said second portion of said upstream bandwidth to said second upstream traffic flow if said second number of bytes has a maximum value among said respective number of bytes.

18. The network apparatus according to claim 14, wherein said first timer and said second timer are not at their expiration values and wherein said second module is capable of being configured for allocating said at least part of said upstream bandwidth to the one of said first or second upstream traffic flows having a higher number of bytes waiting to be transmitted.

19. The network apparatus according to claim 13, wherein said second module is further capable of being configured for, during said given frame period and before steps c) and f), allocating a third portion of said upstream bandwidth to a management message to be transmitted upstream by a network termination of said passive optical access network.

20. The network apparatus according to claim 19, wherein said second module is further capable of being configured for:
    updating said number of bytes waiting to be transmitted upstream;
    calculating a width of a remaining part of said upstream bandwidth after allocating;
    initializing an associated timer with the respective delay; and
    preparing an element of a sorted data structure, said element comprising an identifier of said upstream data flow, an identifier of a network termination responsible for transmitting said data flow and a width of said at least part of said upstream bandwidth.

21. The network apparatus according to claim 13, wherein said second module is further capable of being configured for, during said given frame period and before steps c) and f), allocating a fourth portion of said upstream bandwidth to a third traffic flow having a third timer, associated therewith, which has reached its expiration value during a preceding frame period, said preceding frame period being a silent frame period.

22. The network apparatus according to claim 13, wherein said second module is capable of being configured for allocating said first portion of said upstream bandwidth by one of:
    allocating fixed bandwidth and assured bandwidth;
    allocating non assured bandwidth; and
    allocating best effort bandwidth.

23. The network apparatus according to claim 13, wherein said second upstream traffic flow is part of a number of upstream traffic flows to be transmitted in said passive optical access network, wherein each of said number of upstream traffic flows is associated with a respective timer, wherein the timers associated with said number of upstream traffic flows are not at their respective expiration value and wherein said first timer is at its expiration value, wherein said second module is capable of being configured for allocating said at least part of said second portion of said upstream bandwidth to said second upstream traffic flow if the value of said second timer is closest to its expiration value among said not yet expired timers.

24. The network apparatus according to claim 13, wherein said first timer and said second timer are not at their expiration values, said second module capable of being configured for allocating said at least part of said upstream bandwidth to the one of said first or second upstream traffic flows having the timer closer to the expiration value.

25. A passive optical network comprising the network apparatus of claim 13, for interfacing a passive optical network with a core network.

\* \* \* \* \*